United States Patent
Kim

(10) Patent No.: US 11,358,629 B2
(45) Date of Patent: Jun. 14, 2022

(54) APPARATUS FOR CONTROLLING MOTOR-DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 324 days.

(21) Appl. No.: 16/550,859

(22) Filed: Aug. 26, 2019

(65) Prior Publication Data

US 2020/0062296 A1   Feb. 27, 2020

(30) Foreign Application Priority Data

Aug. 27, 2018   (KR) .......................... 10-2018-0100431

(51) Int. Cl.
  *B62D 5/04*   (2006.01)
  *B62D 6/00*   (2006.01)
  (Continued)

(52) U.S. Cl.
  CPC ............. *B62D 5/046* (2013.01); *B62D 6/002* (2013.01); *G05D 1/0061* (2013.01); *G05D 1/0223* (2013.01)

(58) Field of Classification Search
  CPC ............. B60W 30/09; B60W 30/0953; B60W 30/0956; B60W 50/082; B60W 50/10;
  (Continued)

(56) References Cited

U.S. PATENT DOCUMENTS

| 8,204,652 B2 * | 6/2012 | Yang ..................... B60T 8/1755 701/41 |
| 2008/0255729 A1 * | 10/2008 | Ichinose .............. B62D 15/025 701/42 |

(Continued)

FOREIGN PATENT DOCUMENTS

| CN | 105939917 | 9/2016 |
| CN | 106541941 | 3/2017 |

(Continued)

OTHER PUBLICATIONS

Chinese Office Action dated Aug. 4, 2021 issued in CN Application No. 201910790370.2.

*Primary Examiner* — Jeff A Burke
*Assistant Examiner* — Sihar A Karwan
(74) *Attorney, Agent, or Firm* — DLA Piper LLP (US)

(57) ABSTRACT

An apparatus for controlling an MDPS system includes a driving information input unit configured to detect driving information generated during autonomous driving of an autonomous vehicle and input the same to an MDPS controller; a command information input unit configured to input a command for controlling the autonomous vehicle to the MDPS controller in consideration of a road or route along which the autonomous vehicle is to drive, the command being generated by a command information input unit; and the MDPS controller configured to provide a final output that is corrected using a weight (K) set depending on a preset vehicle speed based on the information inputted from the driving information input unit and the command information input unit when the autonomous vehicle switches an operation mode for MDPS control depending on a change in the vehicle speed while driving in an autonomous driving mode.

12 Claims, 3 Drawing Sheets

(51) Int. Cl.
*G05D 1/02* (2020.01)
*G05D 1/00* (2006.01)

(58) Field of Classification Search
CPC ............... B60W 50/12; B60W 30/12; B60W 2710/202; B60W 2540/18; B60W 2050/0091; B60W 2520/10; B60W 2520/105; B60W 2520/125; B60W 2520/14; B60W 2520/28; B60W 2540/12; B62D 15/0265
See application file for complete search history.

(56) References Cited

U.S. PATENT DOCUMENTS

2016/0347328 A1   12/2016  Takehara
2020/0377152 A1*  12/2020  Taniguchi ............... B62D 5/046

FOREIGN PATENT DOCUMENTS

| CN | 110891849 | 3/2020 |
| JP | 2015-093569 | 5/2015 |
| KR | 10-2015-0035204 A | 4/2015 |

* cited by examiner

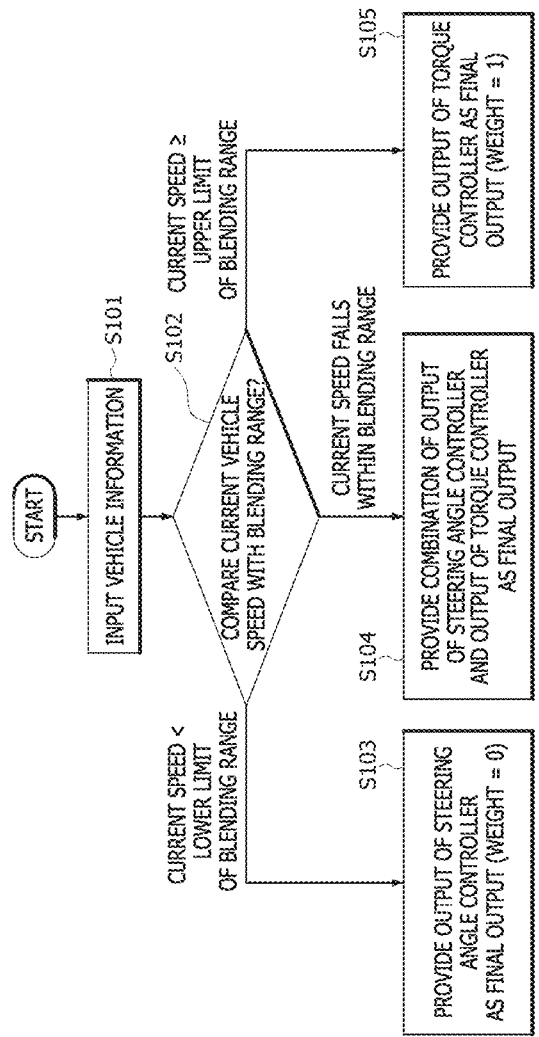

APPARATUS FOR CONTROLLING MOTOR-DRIVEN POWER STEERING SYSTEM

CROSS-REFERENCES TO RELATED APPLICATIONS

The present application claims priority to Korean application number 10-2018-0100431, filed on Aug. 27, 2018, which is incorporated by reference in its entirety.

BACKGROUND OF THE INVENTION

The present invention relates to an apparatus and method for controlling a motor-driven power steering (MDPS) system, and more particularly, to an apparatus and method for controlling an MDPS system, which are configured to compensate for an output difference that is generated when an autonomous vehicle switches an operation mode (that is, an operation mode for MDPS control) in response to a change in a vehicle speed in an autonomous driving mode.

Recently, with the development of automobile technology, an autonomous vehicle, which is capable of autonomously driving without manipulation by a driver, is expected to be rapidly spread. Such an autonomous vehicle controls various types of sensors and control systems with Artificial Intelligence (AI), thereby enabling self-driving.

Also, the autonomous vehicle is advantageous in that an accident caused due to the carelessness of a driver or aggressive driving may be prevented, and in that even a person who does not have a driving license, a person who is visually impaired, and a person who is still legally child may freely use a vehicle. Particularly, more research on the safety of autonomous vehicles is in progress. For example, technology for stably transferring control of a vehicle to a driver when an autonomous mode is switched (or transitioned) to a manual mode in which a driver manually manipulate the vehicle is actively being researched.

However, there is a lack of research on technology for helping a user feel secure when the autonomous vehicle operates in an autonomous mode. The lack of stability may cause anxiety and distrust in autonomous driving.

For example, a user may feel inconvenience when an operation mode for MDPS control (or MDPS control) is transitioned in response to a change in the vehicle speed (for example, from a low speed to a high speed or vice versa) while the autonomous vehicle is operating in an autonomous mode. For example, when the vehicle speed changes from a low speed to a high speed (or from a high speed to a low speed), the operation mode for MDPS control is changed from a position control mode to a torque control mode (or from a toque control mode to a position control mode). Here, an output difference may be caused in the process of changing the operation mode for MDPS control.

As described above, when an output difference is caused in the process of changing the operation mode for MDPS control, there is a problem in which passengers in the vehicle may feel inconvenience, that is, user stability may be reduced.

Accordingly, there is required a method for compensating for an output difference generated in response to the transition of an operation mode (that is, an operation mode for MDPS control) that is caused due to a change in the vehicle speed of an autonomous vehicle operating in an autonomous mode.

The related art of the present invention is disclosed in Korean Patent No. 10-1779823 registered on Sep. 13, 2017 and entitled "Method for switching control mode in autonomous vehicle and apparatus therefor".

SUMMARY OF THE INVENTION

The present invention has been made keeping in mind the above problems, and an embodiment of the present invention is directed to an apparatus and method for controlling an MDPS system, which are capable of compensating for an output difference generated when an autonomous vehicle switches an operation mode (that is, an operation mode for MDPS control) in response to a change in the vehicle speed while operating in an autonomous mode.

An apparatus for controlling a motor-driven power steering (MDPS) system in accordance with one aspect of the present invention may include a driving information input unit configured to detect driving information generated during autonomous driving of an autonomous vehicle and to input the driving information to an MDPS controller; a command information input unit configured to input a command for controlling the autonomous vehicle to the MDPS controller in consideration of a road or a route along which the autonomous vehicle is to drive, the command being generated by a command information input unit; and the MDPS controller configured to provide a final output that is corrected using a weight (K) set depending on a preset vehicle speed based on the information inputted from the driving information input unit and the command information input unit when the autonomous vehicle switches an operation mode for MDPS control depending on a change in a vehicle speed while driving in an autonomous driving mode.

In the present invention, the driving information input unit may detect at least one of a vehicle speed and a steering angle using at least one sensor included in the autonomous vehicle and input the detected information to the MDPS controller.

In the present invention, the command information input unit may input a command steering angle and a command torque to the MDPS controller as commands for steering the autonomous vehicle along a lane of the road or route along which the autonomous vehicle is to drive.

In the present invention, the MDPS controller may include a steering angle controller configured to receive a command steering angle from the command information input unit and to output a corrected MDPS control signal for following the command steering angle through feedback control based on currently detected vehicle information at a specified low speed; a torque controller configured to receive a command torque from the command information input unit and to output an MDPS control signal for following the command torque without change by operating in an open loop method based on the currently detected vehicle information at a specified high speed; a weight table configured to store a weight (K) set depending on a vehicle speed in order to compensate for an output difference generated when the operation mode for MDPS control is switched depending on the change in the vehicle speed; and a blending controller configured to receive an output of the steering angle controller, an output of the torque controller, and the weight (K) of the weight table, to correct the output of the steering angle controller and the output of the torque controller depending on the vehicle speed based on a preset equation, and to provide the final output.

In the present invention, the blending controller may apply (weight (K)*output of torque controller (B)+(1−weight (K))*output of torque controller (A)) as the preset equation.

In the present invention, the blending controller may be configured to apply a first weight (K=0) and provide the output of the steering angle controller as the final output when the vehicle speed is less than a lower limit of a specified blending range; to apply a second weight (K=1) and provide the output of the torque controller as the final output when the vehicle speed is greater than an upper limit of the specified blending range; and to provide the output corrected by applying a third weight (0<K<1) as the final output when the vehicle speed falls within the specified blending range.

A method for controlling a motor-driven power steering (MDPS) system in accordance with another aspect of the present invention may include receiving, by an MDPS controller of an apparatus for controlling an MDPS system, a vehicle speed of an autonomous vehicle that is driving; comparing, by the MDPS controller, the vehicle speed with a specified blending range; and providing, by the MDPS controller, an output corrected by applying a first weight (K=0) to a preset equation as a final output when the vehicle speed is less than a lower limit of the specified blending range as a result of comparison of the vehicle speed with the specified blending range, providing, by the MDPS controller, an output corrected by applying a third weight (0<K<1) to the preset equation as the final output when the vehicle speed falls within the specified blending range, and providing, by the MDPS controller, an output corrected by applying a second weight (K=1) to the preset equation as the final output when the vehicle speed is greater than an upper limit of the specified blending range.

In the present invention, the blending range may be a vehicle speed range for applying the weight (K) for compensating for an output difference that is generated when an operation mode for MDPS control is switched depending on a change in the vehicle speed.

In the present invention, the blending range may be set using a first speed for which the first weight (K=0) is applied and a second speed for which the second weight (K=1) is applied; and when the vehicle speed falls within the blending range, the third weight (0<K<1) may be applied.

In the present invention, the MDPS controller may apply (weight (K)*output of torque controller (B)+(1−weight (K))*output of torque controller (A)) as the preset equation.

In the present invention, the MDPS controller may be configured to apply the first weight (K=0) and provide the output of a steering angle controller as the final output when the vehicle speed is less than the lower limit of the specified blending range; and to apply the second weight (K=1) and provide the output of a torque controller as the final output when the vehicle speed is greater than the upper limit of the specified blending range.

In the present invention, the steering angle controller may receive a command steering angle from a command information input unit and output a corrected MDPS control signal for following the command steering angle through feedback control based on currently detected vehicle information at a specified low speed; and the torque controller may receive a command torque from the command information input unit and output an MDPS control signal for following the command torque without change by operating in an open loop method based on the currently detected vehicle information at a specified high speed.

BRIEF DESCRIPTION OF THE DRAWINGS

FIG. 3 is a flowchart for explaining a method for controlling an MDPS system in accordance with an embodiment of the present invention.

DESCRIPTION OF SPECIFIC EMBODIMENTS

Figure 1:
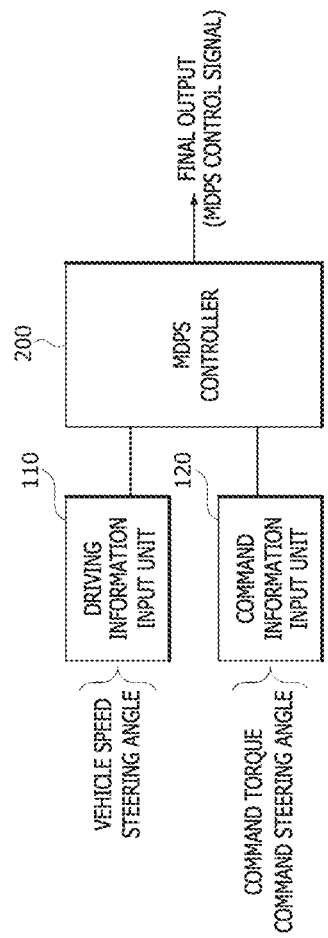
FIG. 1 is an exemplary view illustrating the schematic configuration of an apparatus for controlling an MDPS system in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling an MDPS system in accordance with an embodiment of the invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is an exemplary view illustrating a schematic configuration of an apparatus for controlling an MDPS system in accordance with an embodiment of the present invention.

As illustrated in FIG. 1, the apparatus for controlling an MDPS system in accordance with the present embodiment includes a driving information input unit 110, a command information input unit 120, and an MDPS controller 200.

The driving information input unit 110 detects driving information generated during autonomous driving of an autonomous vehicle and inputs the same to the MDPS controller 200.

For example, the driving information input unit 110 inputs vehicle information, such as a vehicle speed, a steering angle, and the like, which are detected by at least one sensor (for example, a vehicle speed sensor, a steering angle sensor, and the like) included in the autonomous vehicle, to the MDPS controller 200.

The command information input unit 120 inputs a command for controlling the autonomous vehicle, which is generated by a command information input unit (for example, an ECU, an autonomous driving module, and the like) (not illustrated), to the MDPS controller 200 in consideration of the road or route along which the autonomous vehicle will drive.

For example, the command information input unit 120 inputs a command for steering the autonomous vehicle along the lane of a route or road (e.g., a command steering angle, a command torque, or the like) to the MDPS controller 200.

During an autonomous driving operation or the operation of a Lane Keeping Assist System (LKAS) or Lane Keeping Assist (LKS), a conventional autonomous vehicle is configured to control MDPS by outputting a command steering angle when the vehicles drives at low speed (for example, when the vehicle speed is less than 65 Kph) or by outputting a command torque when the vehicle drives at high speed (for example, when the vehicle speed is equal to or greater than 65 Kph).

However, as described above, while an autonomous vehicle is driving in an autonomous mode, when the driving speed changes from a low speed to a high speed or vice versa, a user may feel inconvenience due to an output difference that is caused during the transition of an operation mode for MDPS control (a steering angle control mode and a torque control mode as the operation mode for MDPS control). That is, during the process of switching the operation mode for MDPS control, control stability is momentarily reduced due to the output difference, which may result in inconvenience such as vehicle abnormal behavior, steering vibration, or the like.

In other words, when a vehicle drives at low speed (e.g., when the vehicle speed is less than 65 Kph), because the transverse load is small, it is desirable to control MDPS using a steering angle control method, but when the vehicle drives at high speed (e.g., when the vehicle speed is equal to or greater than 65 Kph), it is more desirable to control MDPS by applying a command torque without change based on a torque control method in terms of responsiveness and control stability. However, when the operation mode is suddenly switched because the vehicle speed changes from a low speed to a high speed or from a high speed to a low speed, MDPS control may not be smoothly performed due to the difference between outputs of the respective operation modes for MDPS control.

Therefore, it is necessary to compensate for the output difference generated during the process in which an operation mode (e.g., a steering angle mode and a torque control mode as the operation mode for MDPS control) is switched in response to a change in the driving speed while the autonomous vehicle is driving in an autonomous mode.

Based on the information inputted from the driving information input unit 110 and the command information input unit 120 (e.g., a vehicle speed, a vehicle steering angle, a command torque, and a command steering angle), the MDPS controller 200 compensates for an output difference (e.g., electric power for controlling the torque of the motor of MDPS) generated in response to the operation mode (e.g., a steering angle control mode and a torque control mode for the operation mode for MDPS control) that is switched depending on a change in the vehicle speed (e.g., change from a high speed to a low speed or vice versa based on a specified speed of 65 Kph) in the autonomous mode of the autonomous vehicle.

For reference, the reason why the output (the power for controlling the torque of the motor of MDPS) varies when the operation mode for MDPS control (e.g., a steering angle control mode and a torque control mode) is switched is that the steering angle control mode, which is usually used at low speed, is configured to control steering using the output that is corrected by operating in a feedback loop (e.g., when 2N is commanded, an output that is corrected to 1N is outputted) but the torque control mode, which is usually used at high speed, is configured to control steering using the output that is not corrected because it operates in an open loop (e.g., when 2N is commanded, 2N is outputted without change).

Hereinafter, the operation of the MDPS controller 200 will be described in more detail.

Figure 2:
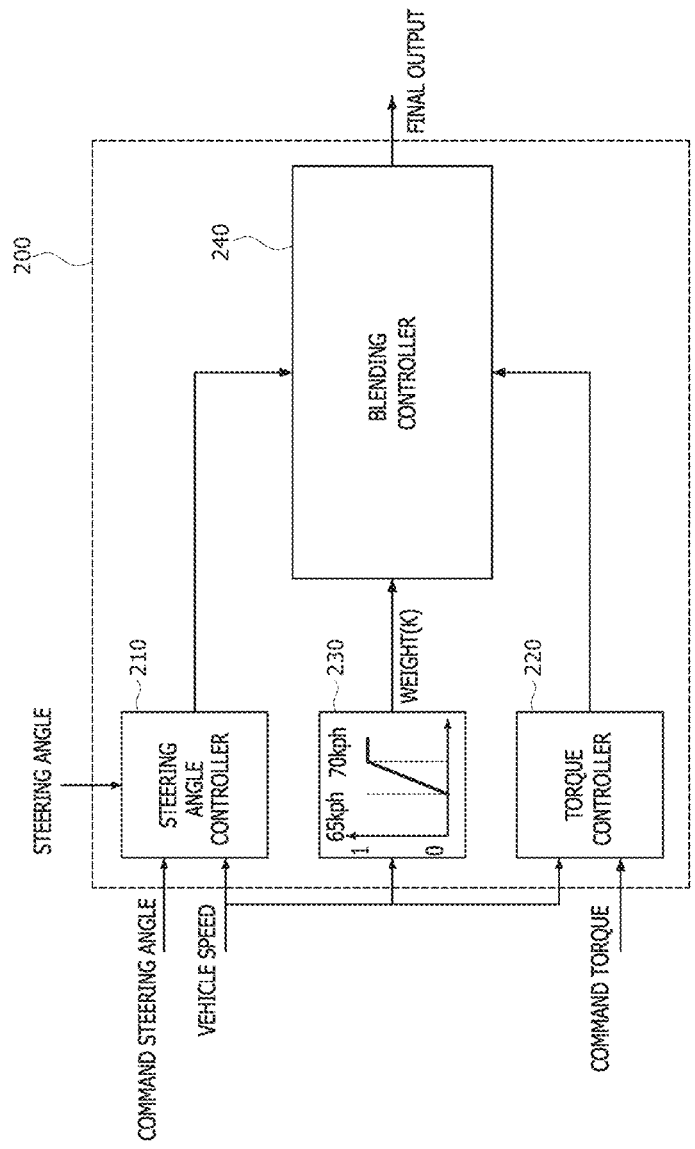
FIG. 2 is an exemplary view illustrating the specific configuration of the MDPS controller in the FIG. 1.

FIG. 2 is an exemplary view illustrating the more specific configuration of the MDPS controller in FIG. 1.

As illustrated in FIG. 2, the MDPS controller 200 of an apparatus for controlling an MDPS system in accordance with the present embodiment includes a steering angle controller 210, a torque controller 220, a weight table 230, and a blending controller 240.

The steering angle controller 210 receives a command steering angle from a command information input unit (e.g., an ECU, an autonomous driving module, or the like) (not illustrated) and follows the command steering angle through feedback control at low speed based on the currently detected vehicle information (e.g., the vehicle speed and the steering angle).

The steering angle controller 210 operates mainly at low speed (e.g., less than 65 Kph) based on a feedback loop and outputs an MDPS control signal that is corrected in order to follow the command steering angle (e.g., when 2N is commanded, an output corrected to 1N is outputted).

The torque controller 220 receives a command torque from the command information input unit (e.g., an ECU, an autonomous driving module, or the like) (not illustrated) and outputs a torque output matching the command torque through open-loop control at high speed based on the currently detected vehicle information (e.g., the vehicle speed).

The torque controller 220 operates mainly at high speed (e.g., 65 Kph or greater) based on an open loop and outputs an MDPS control signal that follows the command torque without change (e.g., when 2N is commanded, 2N is outputted without change).

The weight table 230 outputs a weight value for compensating for the output difference that is generated when the operation mode (e.g., the steering angle control mode and the torque control mode as the operation mode for MDPS control) is switched depending on a change in the vehicle speed.

For example, the weight table 230 includes a table contains a weight (K) set depending on a vehicle speed in order to compensate for the output difference that is generated when the operation mode (e.g., the steering angle control mode and the torque control mode as the operation mode for MDPS control) is switched depending on a change in the vehicle speed.

The blending controller 240 receives the output of the steering angle controller 210, the output of the torque controller 220, and the weight (K) outputted from the weight table 230.

Also, the blending controller 240 provides the output that is corrected based on a preset equation (K*B+(1−K)*A) as the final output. Here, K denotes a weight, B denotes the output of the torque controller, and A denotes the output of the steering angle controller.

For example, when the vehicle drives at low speed (that is, when the vehicle speed is less than a specified speed (e.g., 65 Kph)), only the output of the steering angle controller 210 is finally outputted because the weight (K) becomes 0. When the vehicle drives at high speed (that is, when the vehicle speed is equal to or greater than a specified speed (e.g., 70

Kph)), only the output of the torque controller 220 is finally outputted because the weight (K) becomes 1. Also, when the vehicle speed falls within a specified blending range (e.g., when the vehicle speed is equal to or greater than 65 Kph and less than 70 Kph), the weight (0<K<1) set depending on the vehicle speed specified in the weight table is applied, whereby smoothly calibrated output is finally outputted.

FIG. 3 is a flowchart for explaining a method for controlling an MDPS system in accordance with an embodiment of the present invention.

As illustrated in FIG. 3, the MDPS controller 200 of the apparatus for controlling an MDPS system in accordance with the present embodiment receives the current vehicle information (e.g., a vehicle speed) at step S101 and compares the current vehicle speed with a specified blending range (namely, blending speed range) at step S102.

Here, the blending range is set in order to apply a weight (K) for compensating for the output difference generated when an operation mode (e.g., a steering angle control mode and a torque control mode as an operation mode for MDPS control) is switched in response to a change in the vehicle speed.

Therefore, the blending range is set based on a first vehicle speed (e.g., 65 Kph) for which a first weight (K=0) is applied and on a second vehicle speed (e.g., 70 Kph) for which a second weight (K=1) is applied, and when the vehicle speed falls within the blending range, a third weight (0<K<1) is applied.

Here, it should be noted that the detailed settings (e.g., being less than the vehicle speed, being equal to or less than the vehicle speed, being equal to or greater than the vehicle speed, and being greater than the vehicle speed) related to the vehicle speeds (that is, the first vehicle speed and the second vehicle speed) that set the lower limit and the upper limit of the blending range used to apply a weight may be changed.

As the result of comparison of the vehicle speed with the specified blending range (namely, blending vehicle speed range), when it is determined that the vehicle speed falls out of the specified blending range (e.g., the vehicle speed is less than the lower limit of the blending range), the MDPS controller 200 applies the first weight (K=0) to the preset equation (weight (K)*output of torque controller (B)+(1−weight (K))*output of steering angle controller (A)), thereby providing the corrected output (that is, the output of the steering angle controller) as the final output at step S103.

Also, as the result of comparison of the vehicle speed with the specified blending range (namely, blending vehicle speed range), when it is determined that the current vehicle speed falls within the specified blending range, the MDPS controller 200 applies the third weight (0<K<1) to the preset equation (weight (K)*output of torque controller (B)+(1−weight (K))*output of steering angle controller (A)), thereby providing the corrected output (a combination of the output of the steering angle controller and the output of the torque controller) as the final output at step S104.

Also, as the result of comparison of the vehicle speed with the specified blending range (namely, blending vehicle speed range), when it is determined that the vehicle speed falls out of the specified blending range (e.g., the vehicle speed is equal to or greater than the upper limit of the blending range), the MDPS controller 200 applies the second weight (K=1) to the preset equation (weight (K)*output of torque controller (B)+(1−weight (K))*output of steering angle controller), thereby providing the corrected output (that is, the output of the torque controller) as the final output at step S105.

As described above, the present embodiment may stably control MDPS by compensating for an output difference generated when an operation mode is switched depending on a change in the vehicle speed while an autonomous vehicle is driving in an autonomous mode, whereby autonomous driving performance may be improved, and inconvenience may be reduced.

In accordance with one aspect of the present invention, the present invention may compensate for an output difference generated when an autonomous vehicle switches an operation mode (that is, an operation mode for MDPS control) in response to a change in the vehicle speed while operating in an autonomous mode.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for controlling a motor-driven power steering (MDPS) system, comprising:
a driving information input unit configured to detect driving information generated during autonomous driving of an autonomous vehicle and to input the driving information to an MDPS controller;
a command information input unit configured to input a command for controlling the autonomous vehicle to the MDPS controller in consideration of a road or a route along which the autonomous vehicle is to drive, the command being generated by a command information input unit; and
the MDPS controller configured to provide a final output that is corrected using a weight (K) set depending on a preset vehicle speed, wherein the final output is based on the information inputted from the driving information input unit and the command information input unit and is provided when the autonomous vehicle switches an operation mode for MDPS control, the MDPS controller being configured to:
provide a steering angle controller output as the final output when a vehicle speed is less than a first threshold;
provide a torque controller output as the final output when the vehicle speed is above a second threshold; and
provide the final output that is corrected by applying the weight to the steering angle controller output and the torque controller output when the vehicle speed is within a range defined by the first and second thresholds.

2. The apparatus of claim 1, wherein the driving information input unit detects at least one of a vehicle speed and a steering angle using at least one sensor included in the autonomous vehicle and inputs the detected information to the MDPS controller.

3. The apparatus of claim 1, wherein the command information input unit inputs a command steering angle and a command torque to the MDPS controller as commands for steering the autonomous vehicle along a lane of the road or route along which the autonomous vehicle is to drive.

4. The apparatus of claim 1, wherein the MDPS controller comprises:
a steering angle controller configured to receive a command steering angle from the command information input unit and to output a corrected MDPS control signal for following the command steering angle through feedback control based on currently detected vehicle information at a specified low speed;

a torque controller configured to receive a command torque from the command information input unit and to output an MDPS control signal for following the command torque without change by operating in an open loop method based on the currently detected vehicle information at a specified high speed;

a weight table configured to store a weight (K) set depending on a vehicle speed in order to compensate for an output difference generated when the operation mode for MDPS control is switched depending on the change in the vehicle speed; and a blending controller configured to receive an output of the steering angle controller, an output of the torque controller, and the weight (K) of the weight table, to correct the output of the steering angle controller and the output of the torque controller depending on the vehicle speed based on a preset equation, and to provide the final output.

5. The apparatus of claim 4, wherein the blending controller applies (weight (K)*output of torque controller (B)+(1−weight (K))*output of torque controller (A)) as the preset equation.

6. The apparatus of claim 5, wherein the blending controller is configured to:
apply a first weight (K=0) and provide the output of the steering angle controller as the final output when the vehicle speed is less than a lower limit of a specified blending range;
apply a second weight (K=1) and provide the output of the torque controller as the final output when the vehicle speed is greater than an upper limit of the specified blending range; and
provide the output corrected by applying a third weight (0<K<1) as the final output when the vehicle speed falls within the specified blending range.

7. A method for controlling a motor-driven power steering (MDPS) system, comprising:
receiving, by an MDPS controller of an apparatus for controlling an MDPS system, a vehicle speed of an autonomous vehicle that is driving;
comparing, by the MDPS controller, the vehicle speed with a specified blending range;
providing, by the MDPS controller, a steering angle controller output as a final output when the vehicle speed is less than a lower limit of the specified blending range as a result of comparison of the vehicle speed with the specified blending range;

providing, by the MDPS controller, a corrected output as the final output when the vehicle speed falls within the specified blending range by applying a weight (K) to the steering angle controller output and a torque controller output, and providing, by the MDPS controller, the torque controller output as the final output when the vehicle speed is greater than an upper limit of the specified blending range.

8. The method of claim 7, wherein the blending range is a vehicle speed range for applying the weight (K) for compensating for an output difference that is generated when an operation mode for MDPS control is switched depending on a change in the vehicle speed.

9. The method of claim 7, wherein:
the blending range is set using a first speed for which a first weight (K=0) is applied and a second speed for which a second weight (K=1) is applied; and
when the vehicle speed falls within the blending range, a third weight (0<K<1) is applied.

10. The method of claim 7, wherein the MDPS controller applies (weight (K)*output of torque controller (B)+(1−weight (K))*output of torque controller (A)).

11. The method of claim 7, wherein the MDPS controller is configured to:
apply a first weight (K=0) and provide the output of a steering angle controller as the final output when the vehicle speed is less than the lower limit of the specified blending range; and
apply a second weight (K=1) and provide the output of a torque controller as the final output when the vehicle speed is greater than the upper limit of the specified blending range.

12. The method of claim 11, wherein:
the steering angle controller receives a command steering angle from a command information input unit and outputs a corrected MDPS control signal for following the command steering angle through feedback control based on currently detected vehicle information at a specified low speed; and
the torque controller receives a command torque from the command information input unit and outputs an MDPS control signal for following the command torque without change by operating in an open loop method based on the currently detected vehicle information at a specified high speed.

* * * * *